(12) United States Patent
Shukla et al.

(10) Patent No.: US 12,415,476 B2
(45) Date of Patent: Sep. 16, 2025

(54) SYSTEM AND METHOD FOR PORTABLE USER AND VEHICLE SETTINGS

(71) Applicant: BlackBerry Limited, Waterloo (CA)

(72) Inventors: Abhishek Shukla, Ottawa (CA); Sue Hsiu Ying Ludwig, Mississauga (CA); Adam Richard Schieman, Toronto (CA); Geordon Thomas Ferguson, Mississauga (CA)

(73) Assignee: BlackBerry Limited, Waterloo (CA)

( * ) Notice: Subject to any disclaimer, the term of this patent is extended or adjusted under 35 U.S.C. 154(b) by 313 days.

(21) Appl. No.: 17/902,711

(22) Filed: Sep. 2, 2022

(65) Prior Publication Data
US 2024/0075902 A1 Mar. 7, 2024

(51) Int. Cl.
*B60R 25/01* (2013.01)
*B60R 16/037* (2006.01)
*B60R 25/24* (2013.01)
*G06Q 30/0645* (2023.01)

(52) U.S. Cl.
CPC ............ *B60R 25/01* (2013.01); *B60R 16/037* (2013.01); *B60R 25/24* (2013.01); *G06Q 30/0645* (2013.01); *B60R 2325/101* (2013.01); *B60R 2325/103* (2013.01); *B60R 2325/105* (2013.01)

(58) Field of Classification Search
CPC ....... B60R 25/01; B60R 16/037; B60R 25/24; B60R 2325/101; B60R 2325/103; B60R 2325/105; G06Q 30/0645
See application file for complete search history.

(56) References Cited

U.S. PATENT DOCUMENTS

| | | | | |
|---|---|---|---|---|
| 7,734,396 | B2 * | 6/2010 | Hattori | B60N 2/0244 |
| | | | | 180/326 |
| 9,694,770 | B2 * | 7/2017 | Tobin | B60N 2/0279 |
| 11,267,415 | B2 * | 3/2022 | Akella | B60R 16/037 |
| 2007/0021893 | A1 * | 1/2007 | Ikeda | B60R 25/2081 |
| | | | | 701/49 |
| 2007/0038345 | A1 * | 2/2007 | Heider | B60R 16/037 |
| | | | | 701/49 |

(Continued)

FOREIGN PATENT DOCUMENTS

CN 112874456 A * 6/2021 ........... B60R 16/037

OTHER PUBLICATIONS

Machine Translation of Dong's reference (CN-112874456-A) (Year: 2021).*

(Continued)

*Primary Examiner* — Tarek Elarabi
(74) *Attorney, Agent, or Firm* — Conley Rose, P.C.; J. Robert Brown, Jr.

(57) ABSTRACT

A computer-implemented method for applying user settings to a vehicle is provided. The method includes receiving user settings for a first vehicle, at a second vehicle, and locking access to the user settings on the second vehicle. The user settings being associated with a user. The method includes unlocking access to the user settings on the second vehicle based on: authenticating a user token associated with the user and the user settings, and verifying an identity of the user associated with the user token, and applying the user settings to the second vehicle based on synthesizing the user settings of the first vehicle to the second vehicle.

19 Claims, 4 Drawing Sheets

(56) References Cited

U.S. PATENT DOCUMENTS

| | | | |
|---|---|---|---|
| 2014/0052345 A1* | 2/2014 | Tobin | B60R 16/037 |
| | | | 701/49 |
| 2020/0094651 A1* | 3/2020 | Ostrowski | G06N 20/00 |
| 2020/0169422 A1* | 5/2020 | Ingraham | H04L 9/085 |
| 2020/0216077 A1* | 7/2020 | Nölscher | H04L 67/306 |
| 2023/0036963 A1* | 2/2023 | Yamamoto | B60N 2/002 |

OTHER PUBLICATIONS

European Patent Application No. 23188279.6, Extended European Search Report dated Jan. 4, 2024.

\* cited by examiner

SYSTEM AND METHOD FOR PORTABLE USER AND VEHICLE SETTINGS

FIELD

The present disclosure relates generally to accessing and applying user settings to vehicles, and more particularly to porting and synthesizing user settings between different vehicles.

BACKGROUND

Vehicles offer a variety of settings and features which improve safety, comfort, function and enjoyment for vehicle occupants. Vehicle and user settings may include controls for adjusting seat tilt, angle, position, firmness, and temperature; adjusting cabin temperature, air flow, and air flow direction; enabling/disabling air-bag deployment based on vehicle occupancy; configuring preset audio stations and other audio and music settings; adjusting User Interface (UI) settings and visual display settings; WiFi settings; adjusting side-view and rear-view mirror angles and tilts; controlling windows; steering wheel tilt and temperature; private information including contact names, phone numbers, and e-mail addresses; and so forth. It remains desirable however to develop further improvements and advancements in relation to porting and accessing user settings from one vehicle to a different vehicle, to overcome shortcomings of known techniques, and to provide additional advantages.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments of the present disclosure will now be described, by way of example only, with reference to the attached Figures.

Figure 1:
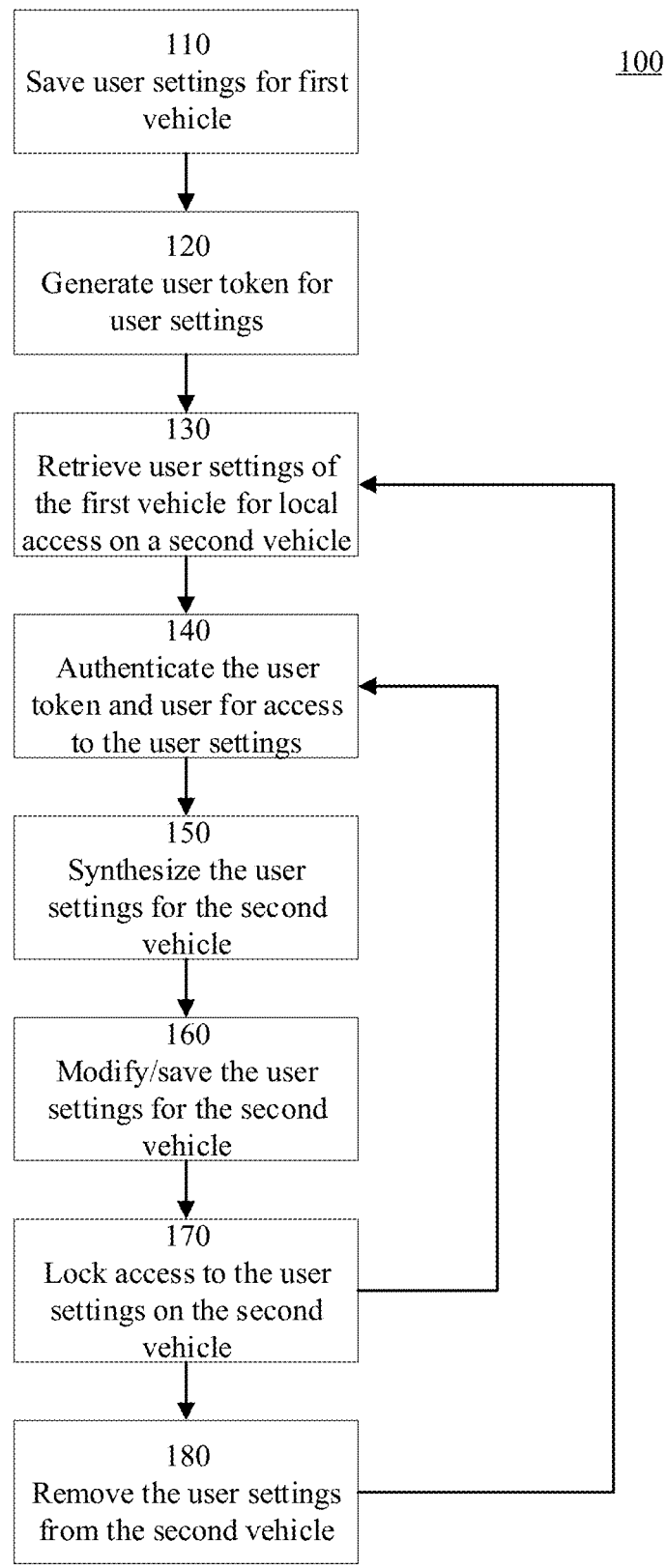
FIG. 1 is a flow chart of an embodiment of a method in accordance with the present disclosure for porting user settings between different vehicles.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompasses by the corresponding description.

DETAILED DESCRIPTION

The following are examples of systems and methods for portable user settings for vehicles in accordance with the present disclosure.

According to an aspect, the present disclosure provides a computer-implemented method for applying user settings to a vehicle, the method comprising receiving user settings for a first vehicle, at a second vehicle, and locking access to the user settings on the second vehicle, the user settings being associated with a user; unlocking access to the user settings on the second vehicle based on: authenticating a user token associated with the user and the user settings, and verifying an identity of the user associated with the user token, and applying the user settings to the second vehicle based on synthesizing the user settings of the first vehicle to the second vehicle.

According to an example embodiment, the user token is stored on an electronic device associated with the user.

According to an example embodiment, the user token is stored on a key fob associated with the user.

According to an example embodiment, authenticating the user token is based on detecting the user token within a proximity of the second vehicle.

According to an example embodiment, detecting the user token comprises use of a wireless communication protocol.

According to an example embodiment, the wireless communication protocol comprises at least one of WiFi, RFID, Bluetooth™, and NFC.

According to an example embodiment, applying user settings to a vehicle may further comprise locking access to the user settings after a fixed period of time subsequent to a driving trip.

According to an example embodiment, applying user settings to a vehicle may further comprise locking access to the user settings in the absence of detecting the user token subsequent to completing a driving trip.

According to an example embodiment, locking access to the user settings comprises locking access to private user settings and leaving access to non-private user settings unlocked.

According to an example embodiment, the private user settings comprise user contact information.

According to an example embodiment, the non-private user settings comprise a seat setting and a mirror setting.

According to an example embodiment, applying user settings to a vehicle may further comprise obtaining a settings offset based on comparing the user settings of the first vehicle to a first plurality of other user settings of the first vehicle; obtaining a baseline setting for the second vehicle based on a second plurality of other user settings of the second vehicle; wherein synthesizing the user settings of the first vehicle to the second vehicle comprises applying the settings offset to the baseline setting for the second vehicle.

According to an example embodiment, synthesizing the user settings of the first vehicle to the second vehicle is based on a mapping between a model of the first vehicle and a model of the second vehicle.

According to an example embodiment, applying user settings to a vehicle may further comprise the user settings from the second vehicle in response to a removal event.

According to an example embodiment, the second vehicle comprises a rental vehicle and the removal event comprises a fixed time associated with a rental contract for the rental vehicle.

According to an example embodiment, the second vehicle comprises a fleet vehicle and the removal event comprises assigning the user to a different fleet vehicle.

According to an example embodiment, the removal event comprises a fixed period of time.

According to an example embodiment, the removal event comprises the user selectively deleting the user settings.

According to an aspect, the present disclosure provides a device for applying user settings to a vehicle, the device comprising: a processor, and a memory communicatively coupled to the processor, for storing instructions thereon; wherein the processor is configured to perform steps for applying user settings to a vehicle in accordance with a method as disclosed herein.

According to an aspect, the present disclosure provides a non-transitory computer readable medium having instructions stored thereon that when executed by a processor, cause the processor to perform a method for applying user settings to a vehicle in accordance with the present disclosure.

The present disclosures provides systems and methods for portable user settings which may enhance data security and privacy, enhance portability and access to user settings between different vehicles, and improve overall user experience with using a vehicle, in addition to other advantages as may be disclosed herein. The systems and methods disclosed herein generally provide for user settings to follow a user (such as driver or passenger) as they access and use different vehicles. In the absence of having user settings for a particular vehicle, the system and methods disclosed herein may synthesize known settings to apply to the new vehicle. Furthermore, the systems and methods disclosed herein generally provide for user settings to comprise ephemeral characteristics, whereby access to the user settings may be restricted, locked, or otherwise removed from the vehicle on a transitory basis in accordance with events associated with use of the vehicle. Among other advantages, ephemeral user settings may provide enhanced security in rental vehicle scenarios, fleet vehicle scenarios, or other shared vehicle scenarios whereby multiple different users may be using or accessing the same vehicle and want to ensure secure protection and privacy for their user settings and data and otherwise prevent access by other users. The systems and methods disclosed herein generally comprise retrieving and securely caching user settings on a vehicle and further unlocking access to the user settings based on identifying a user associated with the settings and based on authenticating a key (such as a software key), user token, or other authentication method associated with the user and their settings. Once unlocked, the user may access their settings, save and update their settings, and/or have the vehicle automatically apply their settings. Aspects of the systems and methods disclosed herein may include synthesizing user settings associated with a first vehicle for use with a second vehicle different from the first vehicle. Aspects of the systems and methods disclosed herein may include transitory access to user settings or otherwise removing and/or deleting the user settings from the vehicle based on how the vehicle is used.

FIG. 1 illustrates a method 100 for porting user settings from a first vehicle to a second vehicle in accordance with an embodiment of the present disclosure. The operation of the method 100 is not intended to be limiting but rather illustrates an example of porting user settings between vehicles. In some embodiments, the method 100 may be accomplished with one or more additional operations not described, and/or without one or more of the operations described. Similarly, the order in which the operation of the method 100 is illustrated and described below is not intended to be limiting, but rather illustrative of an example of porting user settings in accordance with the present disclosure.

In some embodiments, the method 100 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). For example, one or more operations in relation to the method 100 may be performed on one or more processing devices as may be embedded in a vehicle or otherwise controlled by a vehicle; and, one or more operations in relation to the method 100 may be performed in the cloud, in conjunction with other operations performed on or by the vehicle. The one or more processing devices may include one or more devices executing some or all of the operations of the method 100 in response to instructions stored electronically on an electronic storage medium. The one or more processing devices may include one or more devices configured through hardware, firmware, and/or software to be specifically designed for execution of one or more of the operations of the method 100.

The method 100 may include an operation 110 for saving user settings for a vehicle such as saving user settings for a first vehicle that a user may have been driving or otherwise a passenger in. Embodiments of user settings may include settings for a plurality of different vehicles such as vehicles of different makes and models. Embodiments of an operation 110 may include saving and encrypting user settings on a server remote to the vehicle, allowing for other vehicles to retrieve the user settings from the remote storage. For example, the first vehicle can collect user settings from the vehicle via various sensors and send them to a remote server through a communication network. Embodiments of an operation 110 may include saving and encrypting the user settings on a portable electronic device associated with the user, such as on a mobile phone, smart watch, or tablet.

User and/or vehicle settings may include, but are not limited to, one or more of: drive settings and drive mode settings such as sport mode or gas saving mode; seat tilt, angle, position, firmness, temperature, and other seat settings; cabin temperature, air flow, air flow direction, and other climate control settings; enabling/disabling air-bag deployment based on vehicle occupancy; preset audio stations and other audio and music settings; User Interface (UI) settings and visual display settings; WiFi settings; side-view and rear-view mirror angles and tilts; window settings; steering wheel tilt and temperature; private information including contact names, phone numbers, and e-mail addresses, and/or access permissions for connected devices such as a mobile phone, smart watch, or other portable electronic device, such as a laptop or tablet; and so forth. Embodiments in accordance with the present disclosure may include categorizing user settings into different classes. For example, user settings may categorize into a plurality of different classes, each class being associated with different security, access, or privacy restrictions. For example, a first class of user settings may be associated with private or sensitive user settings such as contact names and numbers which may require a higher degree of security, access, or privacy restrictions; a second class of user settings may be associated with non-private or non-sensitive user settings, such as climate controls which may require a lesser degree of security, privacy, or access restrictions, and so forth.

The method 100 may include an operation 120 for generating, creating, or associating a user token with the user settings and the user, such as the user settings saved in accordance with the operation 110. Embodiments in accordance with the present disclosure include using a remote server, such as a cloud implementation, to generate, create, and/or associate a user token with a user and their user settings. Embodiments in accordance with the present disclosure may include using one or more processing devices embedded on a vehicle, or other electronic device, such as a mobile phone, to generate, create, and/or associate a user token with a user and their user settings.

Embodiments of a user token may comprise a software key, encryption/decryption key, access key, user created password, or other credentials for use in authenticating a user and allowing, decrypting, and/or unlocking access to the user settings. Embodiments of a user token may be saved onto or associated with a device, such as a key fob or electronic device, including a mobile phone, smart watch, or other electronic device suitable for storing the user token, such as a mobile phone, smart watch, tablet, or USB key associated with the corresponding user. Embodiments of a user token may also comprise a hardware device, such as an RFID tag, key fob, or other device which acts as physical key or token associated with the user and their settings. In some implementations, the operation 120 can be performed before the operation 110 so that the user token is used to authenticate the user and the user can save the user settings of the first vehicle on a remote server.

The method 100 may include an operation 130 for downloading and/or retrieving the user settings of the first vehicle onto a second vehicle. For example, the second vehicle may leverage nearby WiFi, hotspots, data connections, or other means for obtaining the user settings of the first vehicle from a remote server, nearby electronic device, or other device physically connected to the second vehicle, such as a USB key connected to the second vehicle. As a further example, a remote server in communication with the first and second vehicle, such as may be provided in a cloud implementation, or other electronic device in communication with the first and second vehicles or otherwise having the user settings stored thereon, may push the user settings to the second vehicle. In some cases, the user token is used to authenticate the user so that the user can download or retrieve the user settings of the first vehicle onto the second vehicle. The second vehicle may securely store the user settings locally on the vehicle, making the user settings readily accessible while also restricting access from unauthorized users. For example, the user settings may be encrypted or otherwise stored securely on the second vehicle in a manner that prevents a user, driver, or occupant from accessing or viewing any of the user settings in the absence of authenticating the user and user token associated with the user settings, thereby providing a measure of security and privacy over the user settings for protecting sensitive information such as contact names and numbers from being accessed by unauthorized users. In an embodiment, the second vehicle is the same as the first vehicle.

The method 100 may include an operation 140 for identifying a user and authenticating a user token associated with the user, for permitting access to user settings stored on the vehicle. Identifying a user may include, but is not limited to, use of facial recognition algorithms, username and passwords, temporary pass codes as may be provided upon request to a device associated with the user such as a mobile phone, validating a biometric associated with the user, and other means of authenticating a user's identity. Authenticating a user token may include detecting the user token on a nearby device by wireless means, such as via WiFi, Bluetooth™, Near Field Communication (NFC), Radio Frequency Identification (RFID), and/or other wireless communication standards for use in passively or actively detecting the user token on a device such as a key fob, mobile phone, smartwatch, tablet, laptop, or other electronic device. Embodiments of authenticating a user token may further comprise actively connecting a physical device having the user token to the vehicle, such as engaging a key into the vehicle (for example, engaging a door lock or key ignition), connecting a USB key or other electronic device to the vehicle, and so forth. In some implementations, if the user token is authenticated, the user's identity is also authenticated and the user is identified. Once a user has been identified and their user token authenticated, access restrictions for the user settings may be removed, relaxed, or otherwise dispensed with to permit the user to have transitory access to their user settings.

The method 100 may include an operation 150 for synthesizing user settings of the first vehicle to the second vehicle. For example, the user settings may comprise seat and mirror settings for a first vehicle, but may lack any such previous settings for the second vehicle. For example, the second vehicle may be a vehicle that the user has not driven or ridden in before and the second vehicle may be a different vehicle than the first vehicle and may require a mapping, translation, concordance, or other means of synthesizing the user settings from the first vehicle to recreate their application in the same or similar manner on the second vehicle. Embodiments of an operation 150 may include using one or more processing devices, as may be implemented remotely for example in a cloud implementation, to synthesize user settings of the first vehicle to the second vehicle.

Embodiments of the operation 150 may include using machine learning, artificial intelligence, or other pattern recognition algorithms to determine how a user sets or modifies their user settings in a first vehicle, to develop a model of user behavior and/or how the user sets their user settings. The model may be applied for use in synthesizing the user settings of the first vehicle, to recreate the same or similar user settings in the second vehicle.

Embodiments of the operation 150 may include application of an ergonomic profile for a vehicle. For example, the user settings may include a user profile or body measurements, such as weight, arm length, torso length, leg length, and other body measurements for use in applying user settings based on an ergonomic profile for the second vehicle.

Embodiments of the operation 150 may include applying a settings offset. For example, a settings offset may be determined based on comparing the user settings for a first vehicle to a plurality of different user settings of the first vehicle (e.g., a plurality of user settings of other users for the first vehicle), to determine a relation or comparative offset of the user relative to the plurality of other users. For example, comparing the plurality of user settings may reveal that the user prefers their seat further back and at a greater incline relative to an average of the plurality of different users. In this regard, a similar exercise may be completed with the second vehicle, to synthesize the first vehicle settings to the second vehicle based on applying the settings offset against a baseline setting for the second vehicle. The baseline setting for the second vehicle may be based on a plurality of other user settings of the second vehicle (e.g., an average of the plurality of seat settings for other users of the second vehicle). In some cases, the other users have similar body measurements (e.g., weight, arm length, torso length, and leg length) as the user.

Embodiments of the operation 150 may include applying a profile offset. For example, a first user may only have previously used a first vehicle, while a second user may have previously used both the first vehicle and a second vehicle.

In such a scenario, a profile offset may be determined based on a difference in the user settings for the first and second vehicle. For example, a profile offset may be generated based on a difference between the second user's settings for the first vehicle and the second vehicle to provide a mapping for how user settings may change between the first vehicle and the second vehicle. The profile offset may be used to generate user settings for the first user in the second vehicle based on applying the profile offset to the first user's settings of the first vehicle. This process may be repeated indefinitely to map an overlapping chain of users to synthesize user settings from a first vehicle across a plurality of different vehicles.

Embodiments of the operation 150 may include applying settings based on universal parameters. For example, audio settings may be measured in a first vehicle based on sound pressure and set in the second vehicle based on generating the same sound pressure as the first vehicle. As a further example, sensors may be used to determine distances and viewing angles between a driver and their side view mirrors and/or rear-view mirror in a first vehicle, for use in creating the same or similar field-of-view in the second vehicle.

The method 100 may include an operation 160 for modifying or saving user settings for the second vehicle. For example, a user may prefer to further adjust, modify, or otherwise save their settings for the second vehicle. For example, after synthesizing the user settings for the first vehicle and applying them to the second vehicle, the user may wish to make further adjustments to their user settings. Embodiments of the operation 160 may include the same or similar aspects as the operation 110 for saving the user settings on a server remote to the vehicle, allowing for other vehicles to retrieve the user settings; may include saving the user settings on a portable electronic device, such as a mobile phone, smart watch, or tablet; and may include categorizing the user settings for the second vehicle into different classes of security, privacy, and access restrictions. Embodiments of an operation 160 may be carried out automatically in response to user activity, for example, the second vehicle may automatically save and/or store user settings in response to selections made by a user. Similarly, an electronic device in communication with the second vehicle, such a mobile phone at the command of the user, may save and/or store user settings or otherwise push updated user settings to a central or remove server, as may be provided for example with a cloud implementation. Further yet, a remote server in communication with the second vehicle, such as may be provided in a cloud implementation, may similarly save and/or store user settings in response to selections made by a user.

The method 100 may include an operation 170 for locking or restricting access to user settings. For example, after a completing a driving event, such as arriving at a destination and exiting the vehicle, the operation 170 may restrict some or all user settings from being accessed. For example, after completing a driving event, it may be the case that the next driver, user, or occupant of the vehicle will be a different user and thus access to the previous user's settings may need to be pre-emptively restricted or locked to prevent unauthorized access to their user settings and data. User settings may be locked based on one or more criteria, including security or access classifications selected to identify sensitive information as needing protection. Accordingly, the operation 170 may lock or restrict access to a first subset of user settings that are sensitive in nature (e.g. personal information) and allow access or modification to a second subset of user settings that are non-sensitive in nature. In an embodiment, the operation 170 may restrict or lock access to user settings after a pre-determined amount of time has elapsed subsequent to completing a driving event. In an embodiment, the operation 170 may restrict or lock access to user settings when the associated user token is no longer detectable or connected to the vehicle or a pre-determined amount of time has elapsed since the user token was last authenticated. In an embodiment, after locking access to the user settings, the method 100 may return to a previous operation, such as the operation 140, to further require a user to authenticate their user token and validate their identity again. In an embodiment, the operation 170 may return the second vehicle to a default state of settings after locking access to the second user settings in the second vehicle. Embodiments of an operation 170 may be carried out by the second vehicle, or for example, by an electronic device in communication with the second vehicle, such as by a mobile phone at the command of the user, or for example by a remote server in communication with the second vehicle, as may be provided in a cloud implementation.

The method 100 may include an operation 180 for removing the user settings from the second vehicle. For example, a user may rent a vehicle and set a pre-determined date and time based on the rental contract associated with the rental vehicle, for automatically deleting their user settings from a local memory of the rental vehicle, to prevent a subsequent renter or other user from having access to their user settings and data. As a further example, the user may be one of many users of a fleet of vehicles and may trigger their user settings for deletion from a local memory of a fleet vehicle based on when the user gets assigned to a different fleet vehicle. In this regard, the user settings may comprise an ephemeral or transitory characteristic whereby the settings may only exist on the vehicle for fixed period of time. In an embodiment, the method 100 may return to a previous operation, such as operation 130, to retrieve and store user settings on the vehicle after completing an operation 180 for deleting the user settings from the vehicle. Embodiments of an operation 180 may be carried out by the second vehicle, or for example, by an electronic device in communication with the second vehicle, such as by a mobile phone at the command of the user, or for example by a remote server in communication with the second vehicle, as may be provided in a cloud implementation.

Figure 2:
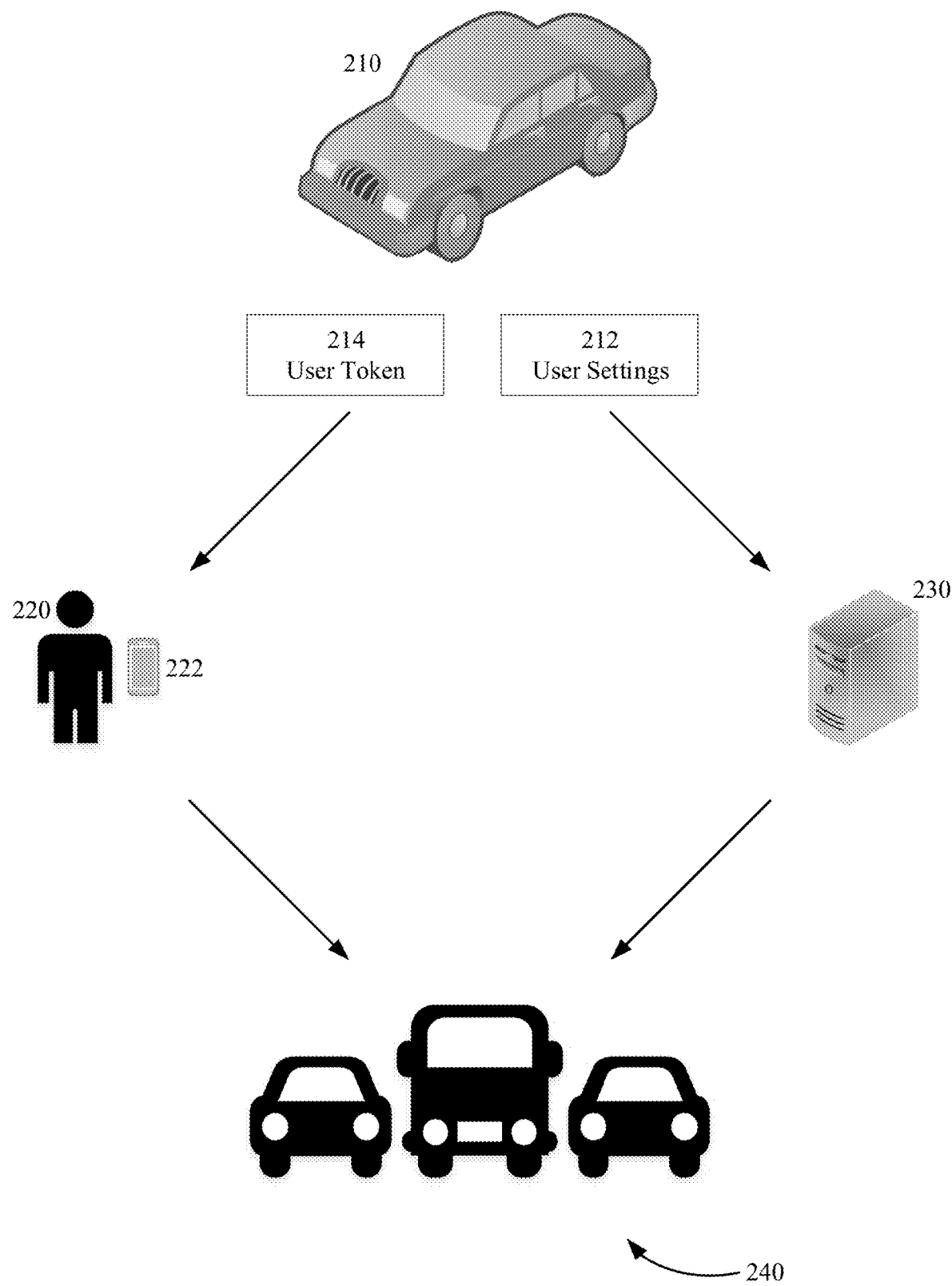
FIG. 2 is a system level diagram illustrating an embodiment in accordance with the present disclosure for porting user settings between different vehicles.

FIG. 2 illustrates a diagram for porting user settings between vehicles in accordance with an embodiment of the present disclosure. FIG. 2 includes a first vehicle 210, a user 220, user settings 212 associated with the first vehicle 210 and the user 220, a user token 214 associated with the user settings 212 and the user 220, a mobile phone 222 of the user 220, a remote server 230, and a plurality of other vehicles 240, such as a fleet of rental vehicles, that the user 220 may access to. The user 220 has setup the user settings 212 for use with the first vehicle 210, which they have previously driven or ridden in as a passenger. The user settings 212 may include a plurality of vehicle settings such as mirror settings, seat settings, audio settings, and preferred climate control settings, as well as user data, such as contact names and numbers that may be stored on the mobile phone 222 or may otherwise include permissions to access contact names and numbers stored on the mobile phone 222. The user settings 212 may be encrypted and stored on the remote server 230, permitting other vehicles such as the plurality of vehicles 240 to retrieve the encrypted settings. In an embodiment, the user settings 212 may be encrypted and stored on a device associated with the user, such as the mobile phone 222.

A user token 214 associated with the user settings 212 and the user 220 may be generated, for use in permitting access to the user settings 212 in other vehicles, such as when the user may access a vehicle from the plurality of vehicles 240. The user token 214 may be stored on the mobile phone 222 or on another device possessed by the user 220, such as a key fob or smart watch. When the user 220 uses a vehicle from the fleet of vehicles 240, the user settings may be retrieved from the server 230, and stored locally on the corresponding vehicle. Embodiments in accordance with the present disclosure may include pre-emptively retrieving the user settings 212 from the server 230 prior to the user 220 accessing or using the vehicle. For example, when renting a vehicle, the rental car may be pre-emptively loaded with the encrypted settings prior to the user accessing the rental car.

When using a vehicle from the fleet of vehicles 240, the user 220 may gain access to their user settings 212 on the vehicle based on authenticating their user token 214 and verifying their identity, as may be accomplished for example in accordance with one or more operations described in relation to the method 100 disclosed herein. Once the user 220 gains access to their user settings 212, a further step of synthesis may be applied to map or translate the user settings 212 of the first vehicle 210 to the current vehicle in accordance with one or more operations described in relation to the method 100 as disclosed herein. In an embodiment, the user settings 212 may already comprise settings for the vehicle and a step of synthesis may not be required. Once the user settings 212 are applied, the user 220 may further modify, update, or save their settings.

Embodiments in accordance with the present disclosure may provide transitory access to the user settings 212 to help secure and protect data from other users that may have access to the vehicle. For example, the ability to access, modify, or save the user settings 212 may be locked or restricted in accordance with one or more operations described in relation to the method 100 disclosed herein. For example, after completing a driving trip, the user 220 may exit the vehicle and displace the user token 214 beyond a detectable range of the vehicle. In response to being unable to detect or access the user token 214, the vehicle may lock access to the user settings 212, to prevent a subsequent user from accessing the user settings 212 in the absence of otherwise authenticating the user token 214 and verifying the identify of the user 220. In an embodiment, access to the user settings 212 may be locked or restricted after a predetermined amount of time elapses subsequent to a driving event, such as subsequent to arriving at a travel destination. In an embodiment, access to a subset of the user settings 212 may be permitted even in the absence of the user token 214. Embodiments in accordance with the present disclosure may also provide transitory storage of the user settings on the vehicle in accordance with one or more operations described in relation to the method 100 disclosed herein. For example, a rental car may be setup to delete or remove the user settings 212 from local memory in accordance with an expected end date and time associated with a rental contract for the rental vehicle. Thus, the ability to even access the user settings 212 may be removed to prevent subsequent rental drivers or other users from having the ability to gain access to sensitive information that may be contained in the user settings 212.

Figure 3:
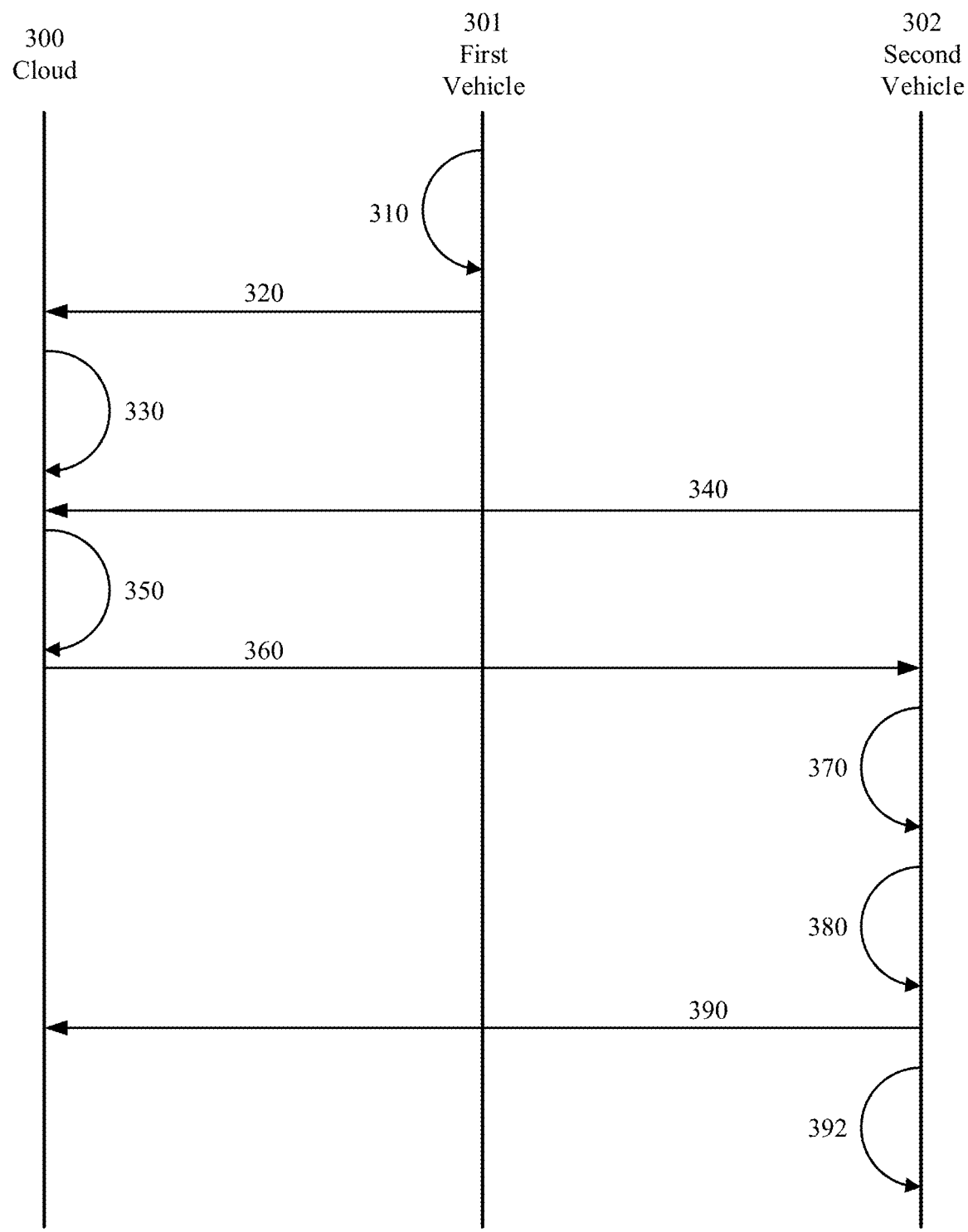
FIG. 3 flowchart of an embodiment in accordance with the present disclosure for porting and synthesizing user settings from a first vehicle to a second vehicle.

FIG. 3 is a flow chart of an embodiment for applying user settings to a vehicle in accordance with the present disclosure. In this illustrative example, steps as disclosed herein, for example, steps such as the operations disclosed with respect to the method 100, may be performed by one or more processing devices as may be implemented in a cloud 300, first vehicle 301, or second vehicle 302. In some implementations, the cloud 300 can be a remote server.

A first vehicle 301 may perform a step 310 for modifying and/or saving user settings in response to selections made by a user with respect to use of the first vehicle 301. The first vehicle 301 may store the user settings on a memory communicatively coupled to the first vehicle 301.

The first vehicle 301 may perform a step 320 for uploading the user settings for the first vehicle to the cloud 300. In an embodiment, the user may selectively cause the first vehicle 301 to upload the user settings to the cloud 300.

The cloud 300 may perform a step 330 for generating or creating a user token to associate with the user and their user settings. The cloud 300 may provide the user token to the user for storage on an electronic device or other item possessed by the user, such as key fob. In an embodiment a key fob is provided to the user comprising a user token associated with the user. The user token may be used to assist with identifying the user and unlocking access to their user settings, for example, by acting as an encryption key to decrypt user settings. In some cases, step 330 may be performed before step 320. For example, the key fob may be provided to the user in advance so that the key fob is used to authenticate the user and the user is allowed to upload the user settings.

The second vehicle 302 may perform a step 340 for notifying the cloud 300 that a user is accessing the second vehicle 302. The notification may instigate the cloud 300 to take further steps as disclosed herein, for example steps to encrypt the user settings and/or to push the user settings to the second vehicle 302, for storage thereon and access therefrom.

The cloud 300 may perform a step 350 for encrypting the user settings based on the user token. The cloud 300 may further perform a step 360 to push the user settings (e.g., the user settings for the first vehicle), in an encrypted format, to the second vehicle 302, for storage thereon in an encrypted format.

The second vehicle 302 may perform a step 370 for authenticating the user and their user token, for unlocking access to the user settings on the second vehicle 302. Unlocking access may include, for example, decrypting the user token to allow for further modification, updating, changing, or otherwise applying the user settings to the second vehicle 302.

The second vehicle 302 may perform a step 380 for synthesizing the user settings to the second vehicle 302 in accordance with the present disclosure. For example, the user settings may reflect user settings for a first vehicle 301 in a manner which may not allow direct application of the user settings to the second vehicle 302, as may arise from different designs between the vehicles 301 and 302. As such, a step of synthesis may be performed to map, translate, or otherwise synthesize the user settings from the first vehicle 301 to provide a similar, analogous, or same experience on the second vehicle 302. In this regard, settings synthesis may allow a user to port their user settings to a plurality of different vehicles and further automate providing a similar user settings experience across the plurality of vehicles. In an embodiment, the second vehicle 302 may notify the cloud 300 to synthesize the user settings for the second vehicle, and the cloud 300 may perform the synthesis and push the synthesized user settings to the second vehicle 302.

The second vehicle 302 may perform a step 390 for modifying and/or saving user settings in response to selections made by a user with respect to use of the second vehicle 302. The second vehicle 302 may store the user settings on a memory communicatively coupled to the second vehicle 302. The second vehicle 302 may further upload the user settings for the second vehicle to the cloud 300. In an embodiment, the user may selectively cause the second vehicle 302 to upload the user settings to the cloud 300. In an embodiment, the cloud 300 or other memory device, may store user settings comprising a plurality of user settings, each user setting being for a different vehicle.

The second vehicle 302 may perform a step 392 for locking or restricting access to the user settings on the second vehicle 302. For example, after a period of non-use or other event associated with the departure of a user, or other event signifying the end of a period of use, the second vehicle 302 may take action to restrict access to the user settings, thereby preventing other subsequent users from accessing the user settings or a subset of the user settings, as the user settings may comprise private or sensitive information, such as contact names and address information, as may be displayed or accessed from an infotainment system associated with the second vehicle 302.

The illustrative example of FIG. 3 is not intended to be limiting but rather illustrates an example of saving and porting user settings between vehicles. In some embodiments, the same may be accomplished with one or more additional steps not described, and/or without one or more of the steps described, and/or may be performed by different actors. Similarly, the order in which the steps of FIG. 3 are illustrated and described is not intended to be limiting, but rather illustrative of an example of porting and synthesizing user settings in accordance with the present disclosure.

Figure 4:
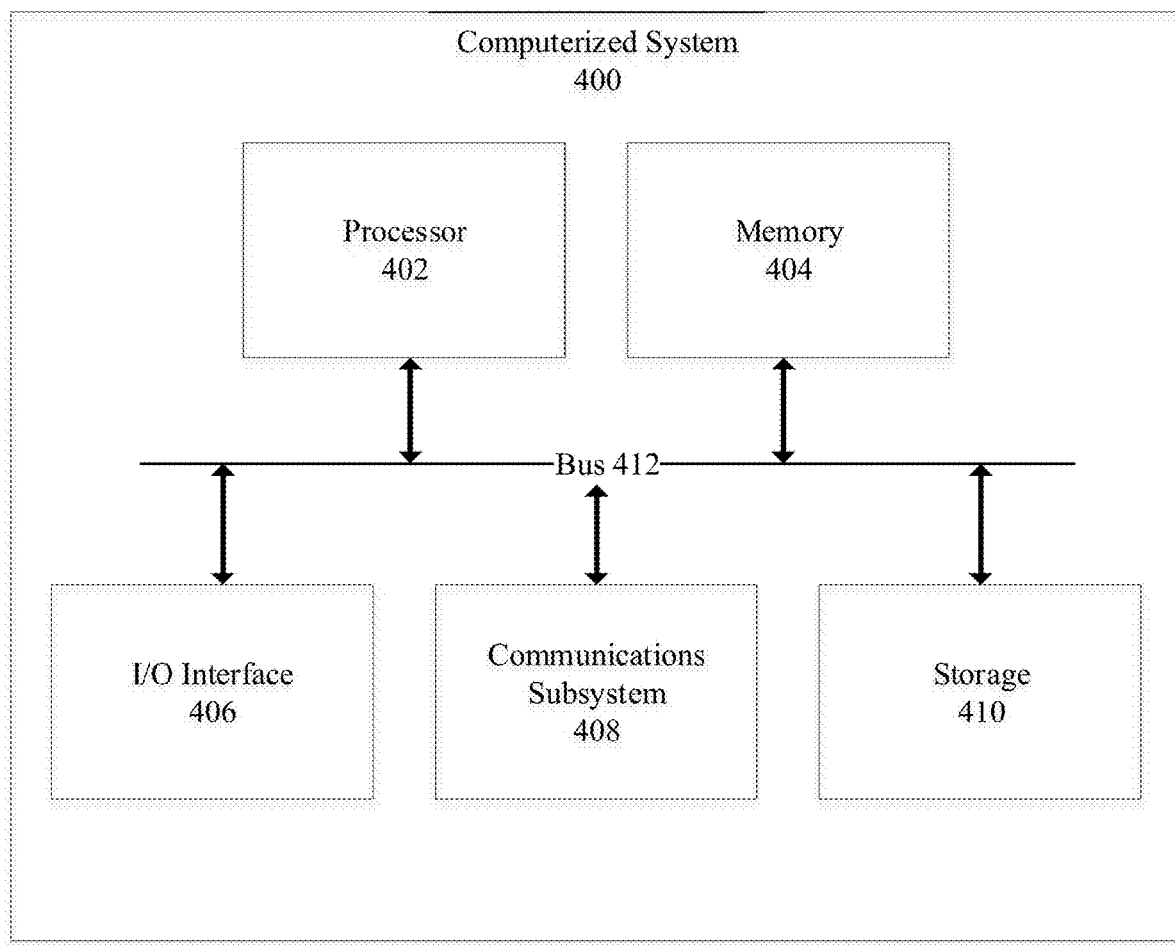
FIG. 4 is a block diagram of an example computing device or system for implementing an aspect of a system and/or method for porting user settings in accordance with the present disclosure.

FIG. 4 is a block diagram of an example computerized device or system 400 that may be used in implementing one or more aspects or components of an embodiment of an system and method for porting user settings for a vehicle in accordance with the present disclosure.

Computerized system 400 may include one or more of a processor 402, memory 404, a mass storage device 410, an input/output (I/O) interface 406, and a communications subsystem 408. Further, system 400 may comprise multiples, for example multiple processors 402, and/or multiple memories 404, etc. Processor 402 may comprise one or more of a digital processor, an analog processor, a digital circuit designed to process information, an analog circuit designed to process information, a state machine, and/or other mechanisms for electronically processing information. These processing units may be physically located within the same device, or the processor 402 may represent processing functionality of a plurality of devices operating in coordination. The processor 402 may be configured to execute modules by software; hardware; firmware; some combination of software, hardware, and/or firmware; and/or other mechanisms for configuring processing capabilities on the processor 402, or to otherwise perform the functionality attributed to the module and may include one or more physical processors during execution of processor readable instructions, the processor readable instructions, circuitry, hardware, storage media, or any other components.

One or more of the components or subsystems of computerized system 400 may be interconnected by way of one or more buses 412 or in any other suitable manner.

The bus 412 may be one or more of any type of several bus architectures including a memory bus, storage bus, memory controller bus, peripheral bus, or the like. The CPU 402 may comprise any type of electronic data processor. The memory 404 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 410 may comprise any type of storage device configured to store data, programs, and other information and to make the data, programs, and other information accessible via the bus 412. The mass storage device 410 may comprise one or more of a solid state drive, hard disk drive, a magnetic disk drive, an optical disk drive, or the like. In some embodiments, data, programs, or other information may be stored remotely, for example in the cloud. Computerized system 400 may send or receive information to the remote storage in any suitable way, including via communications subsystem 408 over a network or other data communication medium.

The I/O interface 406 may provide interfaces for enabling wired and/or wireless communications between computerized system 400 and one or more other devices or systems. For instance, I/O interface 406 may be used to communicatively couple with sensors, such as cameras or video cameras. Furthermore, additional or fewer interfaces may be utilized. For example, one or more serial interfaces such as Universal Serial Bus (USB) (not shown) may be provided.

Computerized system 400 may be used to configure, operate, control, monitor, sense, and/or adjust devices, systems, and/or methods according to the present disclosure.

A communications subsystem 408 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 408 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication sub system 408 may include one or more ports or other components (not shown) for one or more wired connections. Additionally or alternatively, communication subsystem 408 may include one or more transmitters, receivers, and/or antenna elements (none of which are shown).

Computerized system 400 of FIG. 4 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A computer-implemented method for applying user settings to a vehicle, comprising:
   receiving first user settings for a first vehicle, at a second vehicle, and locking access to the first user settings on the second vehicle, wherein the first user settings are associated with a first user;
   unlocking access to the first user settings on the second vehicle by:
      authenticating a user token associated with the first user and the first user settings, and
      verifying an identity of the first user associated with the user token;
   obtaining a first offset between second user settings for the first vehicle and third user settings for the second vehicle, wherein the second user settings and the third user settings are associated with at least one user;
   obtaining a second offset between the first user settings and an average of a plurality of user settings for the first vehicle, wherein the plurality of user settings is associated with other users;
   generating fourth user settings for the second vehicle based on the first user settings, the first offset, the second offset, and a model of behavioral user settings of the first user, wherein the fourth user settings are associated with the first user; and
   applying the fourth user settings to the second vehicle.

2. The method of claim 1, wherein the user token is stored on an electronic device associated with the first user.

3. The method of claim 1, wherein the user token is stored on a key fob associated with the first user.

4. The method of claim 3, wherein authenticating the user token is based on detecting the user token within a proximity of the second vehicle, wherein the detecting the user token comprises use of a wireless communication protocol, wherein the wireless communication protocol comprises at least one of WiFi, radio frequency identification (RFID), Bluetooth, or near field communication (NFC).

5. The method of claim 1, further comprising locking access to the first user settings after a fixed period of time subsequent to a driving trip.

6. The method of claim 1, further comprising locking access to the first user settings in the absence of detecting the user token subsequent to completing a driving trip.

7. The method of claim 6, wherein locking access to the first user settings comprises locking access to private user settings and leaving access to non-private user settings unlocked.

8. The method of claim 7, wherein the private user settings comprise user-contact information.

9. The method of claim 8, wherein the non-private user settings comprise a seat setting and a mirror setting.

10. The method of claim 1, wherein generating the fourth user settings is based on a mapping between a model of the first vehicle and a model of the second vehicle.

11. The method of claim 1, further comprising removing the fourth user settings from the second vehicle in response to a removal event.

12. The method of claim 11, wherein the second vehicle comprises a rental vehicle, and the removal event comprises a fixed time associated with a rental contract for the rental vehicle.

13. The method of claim 11, wherein the second vehicle comprises a fleet vehicle, and the removal event comprises assigning the first user to a different fleet vehicle.

14. The method of claim 11, wherein the removal event comprises a fixed period of time expiring.

15. The method of claim 11, wherein the removal event comprises the first user selectively deleting the fourth user settings.

16. The method of claim 1, wherein the obtaining of the first offset and the generating of the fourth user setting is repeated for an overlapping chain of users to synthesize user settings across a plurality of different vehicles.

17. The method of claim 1, further comprising measuring audio settings in the first vehicle based on sound pressure in the first vehicle, and setting audio settings in the second vehicle to generate the same sound pressure in the second vehicle.

18. A device for applying user settings to a vehicle, the device comprising:
   a processor; and
   a memory communicatively coupled to the processor and storing instructions thereon that when executed by the processor cause the processor to:
      receive first user settings for a first vehicle, at a second vehicle, and lock access to the first user settings on the second vehicle, wherein the first user settings are associated with a first user;
      unlock access to the first user settings on the second vehicle by:
         authenticating a user token associated with the first user and the first user settings, and
         verifying an identity of the first user associated with the user token;
      obtain a first offset between second user settings for the first vehicle and third user settings for the second vehicle, wherein the second user settings and the third user settings are associated with at least one user;
      obtain a second offset between the first user settings and an average of a plurality of user settings for the first vehicle, wherein the plurality of user settings is associated with other users;
      generate fourth user settings for the second vehicle based on the first user settings, the first offset, the second offset, and a model of behavioral user settings of the first user, wherein the fourth user settings are associated with the first user; and apply the fourth user settings to the second vehicle.

19. A non-transitory computer readable medium having instructions stored thereon that when executed by a processor cause the processor to:

receive first user settings for a first vehicle, at a second vehicle, and lock access to the first user settings on the second vehicle, wherein the first user settings are associated with a first user and include a body measurement including at least one of a height or weight of the user, and wherein the second vehicle includes an ergonomic profile of the second vehicle;

unlock access to the first user settings on the second vehicle by:
authenticating a user token associated with the first user and the first user settings, and
verifying an identity of the first user associated with the user token;

obtain a first offset between second user settings for the first vehicle and third user settings for the second vehicle, wherein the second user settings and the third user settings are associated with at least one user;

obtain a second offset between the first user settings and an average of a plurality of user settings for the first vehicle, wherein the plurality of user settings is associated with other users;

generate fourth user settings for the second vehicle based on the first user settings, the first offset, the second offset, and a model of behavioral user settings of the first user, wherein the fourth user settings are associated with the first user; and apply the fourth user settings to the second vehicle by applying the body measurement of the user to the ergonomic profile of the second vehicle.

* * * * *